UNITED STATES PATENT OFFICE.

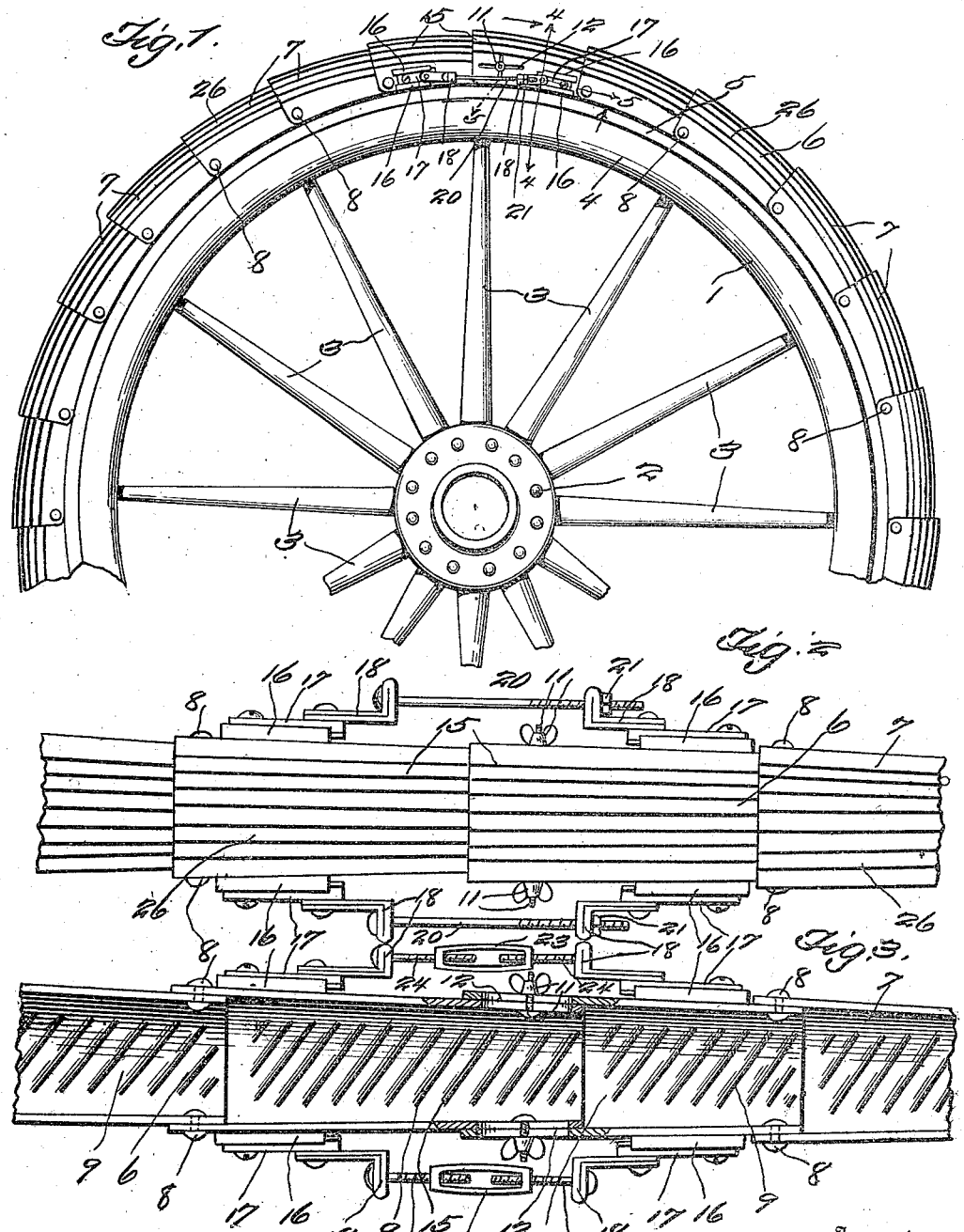

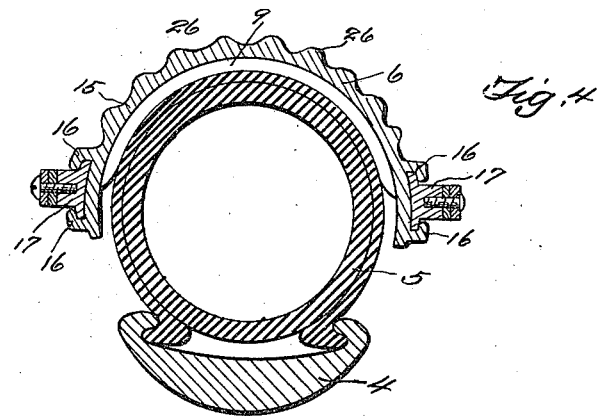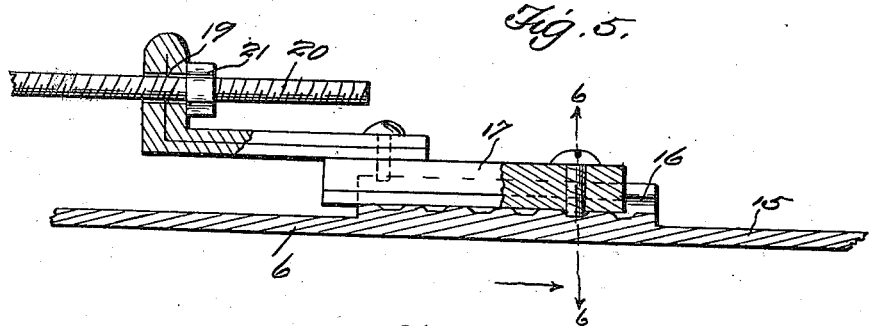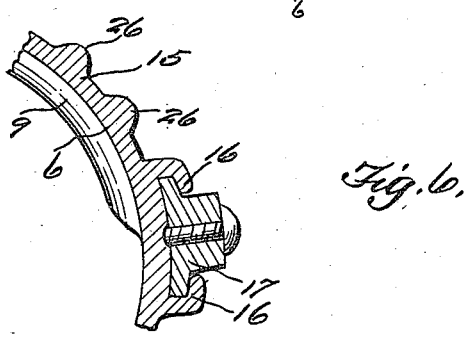

HERMAN A. MIELKE, OF RAYMOND, MINNESOTA.

TIRE-PROTECTOR.

991,003.

Specification of Letters Patent.     Patented May 2, 1911.

Application filed June 8, 1910. Serial No. 565,900.

*To all whom it may concern:*

Be it known that I, HERMAN A. MIELKE, a citizen of the United States, residing at Raymond, in the county of Kandiyohi and State of Minnesota, have invented a new and useful Tire-Protector; and I do hereby declare the following to be a full, clear, and exact description of the invention, such as will enable others skilled in the art to which it appertains to make and use the same.

This invention pertains to a new and useful tire protector, adapted more especially for use in connection with automobile wheels, whereby the tires thereof may be protected against injury.

In this specification and the annexed drawings, a particular design of device is adhered to, but the invention is not to be confined to this specific design.

The device in its actual reduction to practice may necessitate changes and variations, the right thereto belongs to the applicant, provided such changes and variations are comprehended by the appended claims.

In the drawings:—Figure 1 is an elevation of a segment of an automobile wheel, showing the protector applied thereto. Fig. 2 is a plan view of the protector. Fig. 3 is a plan view of the protector, looking upon the inner face of the sections forming the protector showing a slight modification. Fig. 4 is a sectional view on line 4—4 of Fig. 1. Fig. 5 is an enlarged detail sectional view on line 5—5 of Fig. 1. Fig. 6 is a sectional view on line 6—6 of Fig. 5, taken transversely thereof.

Referring to the annexed illustrations, 1 designates the usual form of automobile wheel, having the hub 2, the spokes 3, and the usual form of rim and tire 4 and 5.

6 designates the protector in its entirety, which is composed of a plurality of plates 7, which are joined together in sequence by means of rivets 8. These plates overlap one another, as shown clearly in Fig. 1, and are designed to have individual movement, in order that the protector may accommodate itself to the various irregularities of the surface upon which the wheel travels, or to cater to the compression of the tire itself. These plates, upon their inner circumference or faces, are provided with ribs or projections 9, which engage the tire, in order to prevent the protector from creeping about the wheel annularly, or transversely.

As shown in the drawings, the plates are arched, in order to conform to the contour of the tire. Two of the plates are joined together by means of bolts and nuts 11, which are carried by one of the plates, while the bolts penetrate the slots 12 of the other plate, and by screwing the nuts in one direction or the other the two plates may be loosened or tightened together.

The two plates, which are connected together by a slot and bolt connection, and designated by the characters 15, are provided with guides 16, in which the members 17 of the angle plates 18 are arranged. These angle plates are secured to the members 17 so as to have a pivotal action, the purpose of which will hereinafter appear. These angle plates are provided with apertures 19, as shown, and through the apertures a threaded bolt or rod 20 extends, one end of which being provided with a head, while to the other end a nut 21 is threaded, and by adjusting the nut the two plates may be brought together or farther apart. In place of this threaded rod or bolt, a turnbuckle 23 and two threaded rods 24 may be provided, as illustrated in the drawings.

The outer faces of the plate are provided with ribs 26 running annularly about the protector, in order to prevent the wheel from skidding. It will be evident that when each of the two plates (which carry the adjustable and tightening device) have individual movements, the angle plates will have a pivotal action with regard to the members 17. From the above drawings, it will be noted that a new and useful tire protector is afforded, having the necessary flexibility to cater to the compression of the tire and the irregularities of the ground.

The invention having been set forth, what is claimed as new and useful is:—

1. In a tire protector, a plurality of overlapping arched plates, having means to prevent skidding, two of the plates having a slot and pin or bolt connection, said two plates having guides, members arranged therein, angle plates pivoted to the members, and means coöperating with the angle plates for adjusting and holding, when adjusted, the said two slot and pin connected arched plates.

2. In a tire protector, a plurality of overlapping arched plates, having means to prevent skidding, two of the plates having a slot and pin or bolt connection, said two plates having guides, members arranged therein, angle plates pivoted to the members, a threaded rod penetrating the angle plates, and means threaded to the rod in order that the rod may coöperate with the angle plates for adjusting and holding, when adjusted, the said two slot and pin connected arched plates.

In testimony whereof I have signed my name to this specification in the presence of two subscribing witnesses.

HERMAN A. MIELKE.

Witnesses:
T. GILBERT,
IDA A. SANDERSON.

Copies of this patent may be obtained for five cents each, by addressing the "Commissioner of Patents, Washington, D. C."